United States Patent [19]

Ito et al.

[11] 4,089,010
[45] May 9, 1978

[54] DISPLAY CIRCUIT FOR A CAMERA

[75] Inventors: Tadashi Ito; Nobuaki Sakurada, both of Yokohama; Masaharu Kawamura, Hino; Nobuhiko Shinoda, Tokyo; Fumio Ito, Yokohama; Hiroyashu Murakami, Tokyo, all of Japan

[73] Assignee: Canon Kabushiki Kaisha, Tokyo, Japan

[21] Appl. No.: 728,161

[22] Filed: Sep. 30, 1976

[30] Foreign Application Priority Data

Oct. 2, 1975 Japan .................................. 50-119388

[51] Int. Cl.² .......................... G03B 7/08; G03B 17/20
[52] U.S. Cl. ................................... 354/23 D; 354/53; 354/60 A; 354/60 E; 354/289
[58] Field of Search ................... 354/23 D, 50, 51, 53, 354/60 R, 60 A, 60 E, 289

[56] References Cited

U.S. PATENT DOCUMENTS

| | | |
|---|---|---|
| 3,651,744 | 3/1972 | Okada ................................. 354/60 A |
| 4,006,484 | 2/1977 | Nobusawa ............................ 354/50 |

*Primary Examiner*—Russell E. Adams
*Attorney, Agent, or Firm*—Toren, McGeady and Stanger

[57] ABSTRACT

A photographing information display circuit for a camera which performs digital computation of information relative to exposure, etc. and displays the computed digital values. The display of the digital value computed is effected through an analog display circuit such as a meter circuit by an extremely simplified circuit arrangement, without using any D-A conversion circuit such as a ladder circuit or the like. The invented display circuit arrangement minimizes the electric power requirement for display to solve the problem of electric power consumption for display in small-sized camera.

8 Claims, 10 Drawing Figures

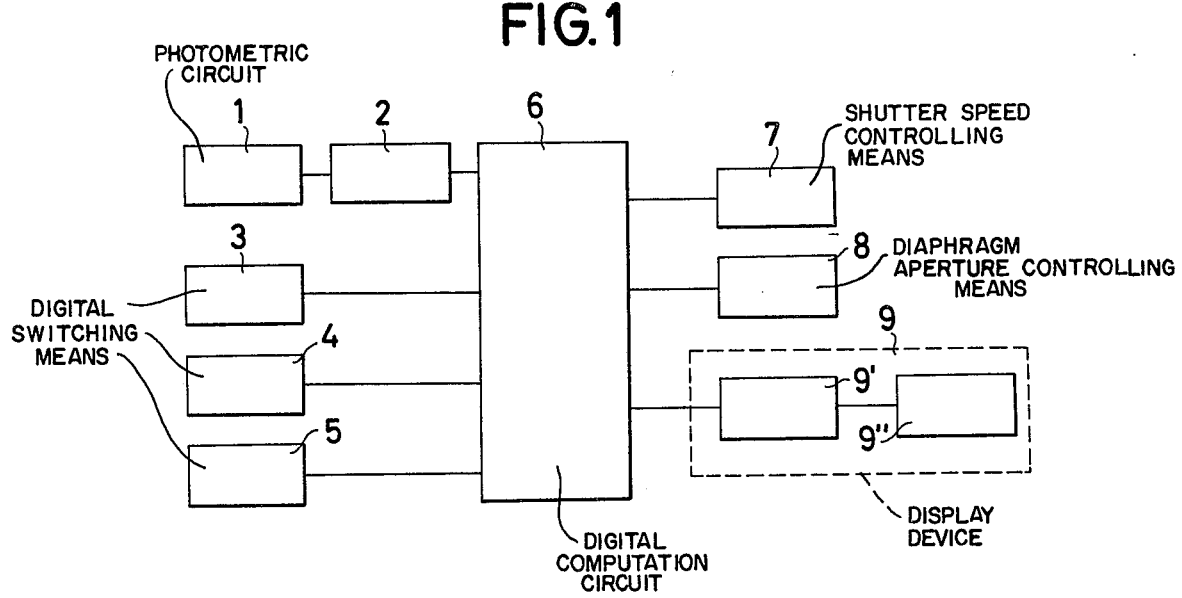
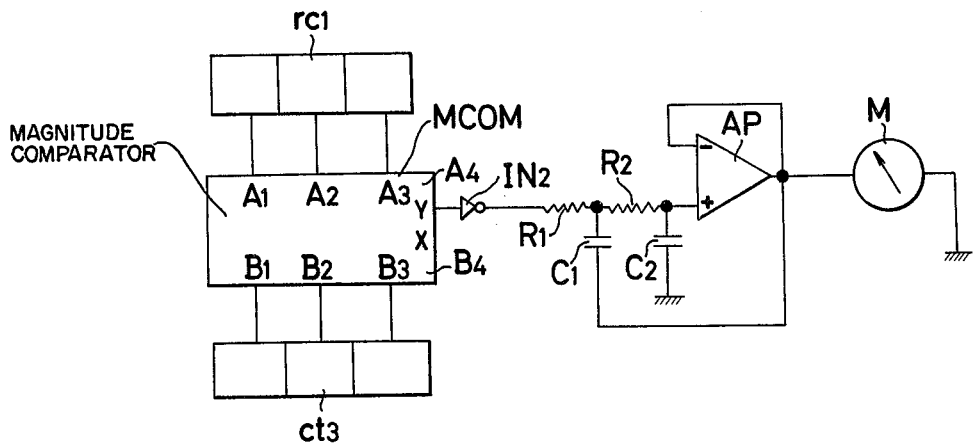

| Film Sensitivity | SF₁ | SF₂ | SF₃ | Aperture Value | SA₁ | SA₂ | SA₃ |
|---|---|---|---|---|---|---|---|
| 50 | 0 | 0 | 0 | 1 | 0 | 0 | 0 |
| 75 | 1 | 0 | 0 | 1.4 | 1 | 0 | 0 |
| 100 | 0 | 1 | 0 | 2 | 0 | 1 | 0 |
| 150 | 1 | 1 | 0 | 2.8 | 1 | 1 | 0 |
| 200 | 0 | 0 | 1 | 4 | 0 | 0 | 1 |
| 300 | 1 | 0 | 1 | 5.6 | 1 | 0 | 1 |
| 400 | 0 | 1 | 1 | 8 | 0 | 1 | 1 |
| 600 | 1 | 1 | 1 | 11 | 1 | 1 | 1 |
("1": ON  "0": OFF)
FIG. 4(a)
FIG. 4(b)
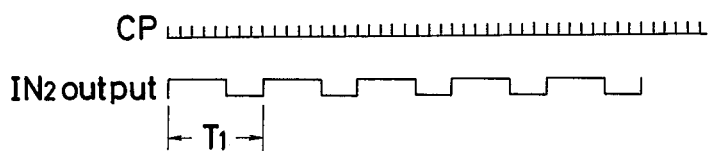
FIG. 4(c)
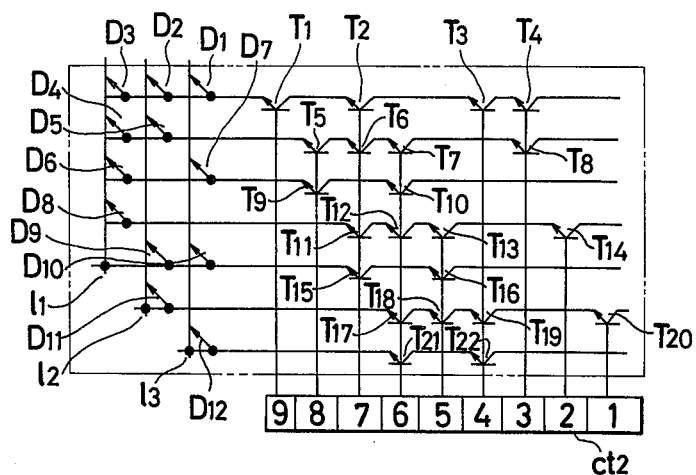

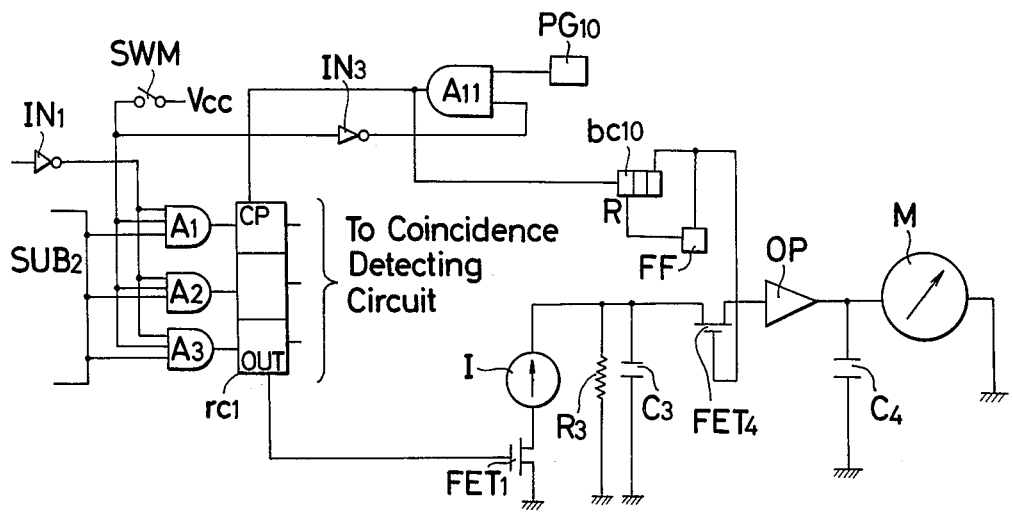
FIG.5
FIG.6
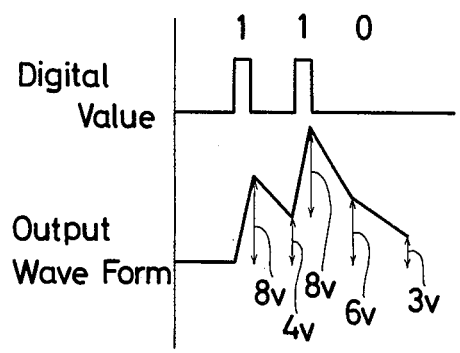

DISPLAY CIRCUIT FOR A CAMERA

BACKGROUND OF THE INVENTION

1. Field of the Invention

This invention relates to a photographing information display circuit for a camera and more particularly to an information display circuit which performs computation of information relative to exposure.

2. Description of the Prior Art

Heretofore, there have been proposed various types of display circuit arrangements that perform computation of exposure information by means of digital computation circuits and display the results of computation by display circuits through digital circuits. However, such a display circuit is generally composed of seven segments or the like. For display, the computed digital value must be converted into segment informations by means of a decoder circuit, a driver circuit, etc. Therefore, the conventional arrangement is of a complex construction requiring a relatively great amount of electric power for display. For a small-sized camera using a very small battery as power source, the use of such a device results in a great ratio of display power requirement for display to the overall power requirement for the camera. The conventional display circuits are thus not only complex in construction but also require a relatively great amount of power supply.

SUMMARY OF THE PRESENT INVENTION

It is therefore an object of this invention to provide a display circuit which displays results of computation, without using any complex display circuit arrangement, by controlling the duty cycle of pulses based on a digital value obtained through computation in such a way as to drive a meter by the pulses.

It is another object of this invention to provide a display circuit which displays results of computation, without complex display circuit arrangement, by driving a meter with pulses of frequency based on a digital value obtained through computation.

It is still another object of this invention to provide a display circuit which displays results of computation, without complex display circuit arrangement, by driving a meter with an integrated amount of electric charge which is integrated according to a digital value obtained through computation.

The further object, features and advantages of this invention will become manifest from the following detailed disclosure, taken in conjunction with the accompanying sheets of drawings in which:

BRIEF DESCRIPTION OF THE DRAWINGS

FIG. 1 is a block diagram illustrating a camera using a display circuit of the present invention as an embodiment example of the invention.

FIG. 3 is a circuit diagram illustrating further details of a display circuit of this invention illustrated in FIG. 2.

FIG. 4a is a table showing the relation of film sensitivity to the switches SF1 through SF3 shown in FIG. 2, the diaphragm aperture value and switches SA1 through SA3 also shown in FIG. 2.

FIG. 4b is a timing chart illustrating the operation of the circuit shown in FIG. 3.

FIG. 4c is a circuit diagram illustrating an example of the code conversion circuit shown in FIG. 2.

FIG. 5 is a circuit diagram illustrating a display circuit as another embodiment example of the invention.

FIG. 6 is a wave form drawing illustrating the operation of the circuit illustrated in FIG. 5.

DESCRIPTION OF THE PREFERRED EMBODIMENTS

Figure 2:
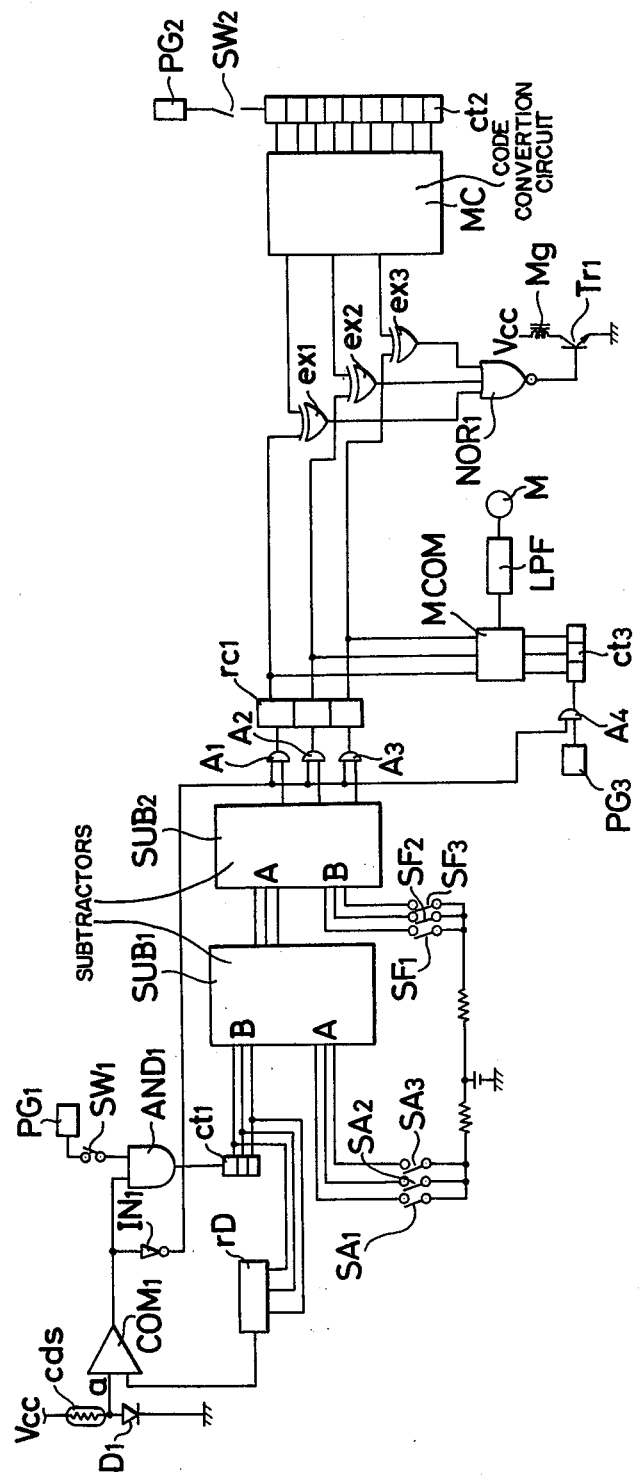
FIG. 2 is a circuit diagram illustrating the details of the embodiment illustrated in the form of a block diagram in FIG. 1 with details shown as applied to shutter control.

Referring to the accompanying drawings, FIG. 1 is a block diagram illustrating an embodiment example using a display circuit arranged in accordance with this invention. In FIG. 1, a photometric circuit 1 measures the brightness of a photographing object by a method, such as a TTL method, and produces an analog information output according to the brightness measured. An A-D converter 2 converts the analog information derived from the photometric circuit into digital information. Digital switching means 3, 4 and 5 are provided for obtaining digital information on shutter time, a diaphragm aperture value and film sensitivity respectively. A reference numeral 6 indicates a digital computation circuit for which various types of computing elements can be used. The digital computation circuit 6 receives digital information on the brightness of the photographing object from the A-D converter 2 and digital information on the shutter time, diaphragm aperture value and film sensitivity from the digital switching means 3, 4 and 5 respectively. The circuit 6 then produces a digital information output required for controlling the shutter time or the diaphragm aperture. Reference numerals 7 and 8 indicate a shutter speed controlling means and a diaphragm aperture controlling means; and 9 indicates a display device arranged in accordance with the invention. The display circuit is composed of a D-A converter 9' which converts the digital information from the digital computation circuit 6 into analog information and a meter 9'' or the like which displays the value of the analog information. With the exception of the display device 9, the rest of the circuit arrangement described in the foregoing is similar to various known digital exposure control circuits. Although the A-D converter 2 which is used for the photometric circuit may be arranged to serve double purposes utilizing it also for the D-A conversion in place of the D-A converter 9', a D-A converter must be separately provided for the display circuit in cases where a double integrating method is employed for the photometric circuit. Since a simple circuit arrangement suffices for the displaying D-A converter, it is generally preferable to provide the converter circuit separately from the other converter.

As described in the foregoing, with the display circuit of the invention employed in a digitally controlled camera which performs control by digitally computing exposure information, the result of the digital computation is converted into an analog value to make analog display. In accordance with the present invention, the conversion of the result of digital computation is converted into the analog value by an extremely simplified circuit arrangement without using such a complex ladder network that is employed in the conventional D-A converter. Now referring to FIGS. 2 through 6, further details of the display circuit of the present invention are as described below:

In FIG. 2, which is a circuit diagram illustrating further details of the embodiment illustrated in the form of a block diagram in FIG. 1 with details as applied to shutter control, a diode $D_1$ is connected in series with a light receiving element cds. A voltage which corresponds to a logarithm of the brightness of a photographing object (voltage corresponding to a value Bv) is produced at a connection node "a" between the light receiving element cds and the diode $D_1$. A pulse oscillator PG is actuated by the operation of an unillustrated power source switch and is connected to one of the input terminals of an AND gate $AND_1$ through a switch $SW_1$, which is interlocked with the power source switch to turn on in response to the operation of the power source switch. A binary counter $ct_1$ is connected to the output terminal of the AND gate $AND_1$ to perform binary counting of the pulses obtained through the AND gate $AND_1$. There is provides a ladder circuit rD which is a known resistance circuit network and is connected to the output terminal of the counter $ct_1$ to convert the content of the counter $ct_1$ into an analog voltage. A comparator $COM_1$ has one input terminal connected to the above stated connection node "a" and another input terminal connected to the output terminal of the ladder circuit rD. The output of the comparator $COM_1$ is inverted from a high level to a low level when the voltage inputs to the comparator becomes equal with each other. A known analaog-to-digital converter is formed by these components PG, $AND_1$, $ct_1$, rD and $COM_1$. Out of the pulses derived from the pulse oscillator PG, only a number of pulses corresponding to the logarithm of the brightness are transmitted to the binary counter $ct_1$. Switches $SA_1$ through $SA_3$ are provided for setting diaphragm aperture information. A diaphragm aperture value is set in the form of a digital value according to the on-off state of these switches. There is provided a full subtractor $SUB_1$ which subtracts a digital value of an input terminal B thereof from a digital value of another input terminal A. Switches $SF_1$ - $SF_3$ are provided for setting the sensitivity of the film employed. The film sensitivity value is set in the form of a digital value according to the on-off state of these switches. Another full subtractor $SUB_2$ is identical with the above stated full subtractor $SUB_1$. There are provided AND gates $A_1$ - $A_3$, each of them having one input terminal connected to the output terminal of the full subtractor $SUB_2$ and having another input terminal connected to the above stated comparator $COM_1$ through an inverter IN. A register $rc_1$ stores the digital value which is received through the AND gates $A_1$ - $A_3$. Another binary counter $ct_2$ is connected to another pulse oscillator $PG_2$ through a switch $SW_2$ which is interlocked with an unillustrated release button. A code conversion circuit which converts the content of the counter $ct_2$ into a digital value representing a preset relation. Exclusive OR gates $ex_1$ - $ex_3$ and an OR gate $NOR_1$ constitute a known coincidence detection circuit, which produces a coincidence signal output when the content of the register $rc_1$ and the output value of the code conversion circuit MC coincide with each other. A transistor $Tr_1$ has the base thereof connected to the OR gate $NOR_1$ while a magnet $Mg_1$ is connected to the transistor. When the transistor $Tr_1$ is turned on, the magnet is operated to cause the rear diaphragm of an unillustrated shutter to travel. The reference symbol $PG_3$ indicates a pulse oscillator; and $A_4$ an AND gate. One of the input terminals of the AND gate $A_4$ is connected to the above stated inverter $IN_1$ while the other input terminal is connected to the pulse oscillator $PG_3$. A counter $ct_3$ performs binary counting of pulses coming through the AND gate $A_4$. The reference symbol MCOM indicates a magnitude comparator; LPF a low-pass filter which is connected to the output terminal of the magnitude comparator MCOM and which makes an integrating action; and M a meter.

FIG. 3 is a circuit diagram illustrating in further detail the display circuit of the embodiment of the invention comprising the magnitude comparator MCOM, low-pass filter LPF, counter $ct_3$ and register $rc_1$ shown in FIG. 2. Referring to FIG. 3, a magnitude comparator 8269 manufactured by Signetic Co., for example, may be employed as the magnitude comparator MCOM. The magnitude comparator MCOM gives a truth table wherein the output terminal Y produces "1" when A ≦ B and produces "0" when A > B. The reference symbol $IN_2$ indicates an inverter. The low-pass filter LPF is composed of resistance $R_1$ and $R_2$, capacitors $C_1$ and $C_2$ and an operational amplifier.

Figure 7:
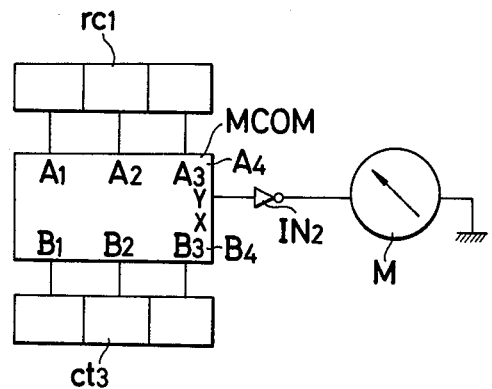
FIG. 7 is a circuit diagram illustrating a modification of the circuit illustrated in FIG. 3.

FIG. 4a is a table showing the relation of film sensitivity to the switches $SF_1$ - $SF_3$, the diaphragm aperture value and switches $SA_1$ - $SA_3$. FIG. 4b is a timing chart illustrating the operation of the circuit illustrated in FIG. 3. FIG. 4c is a circuit diagram illustrating as an example the details of the code conversion circuit shown in FIG. 2. In FIG. 4c, the reference symbols $T_1$ - $T_{22}$ indicate transistors and $D_1$ - $D_{12}$ diodes. Although detailed description of the operation of the code conversion circuit is omitted here as such is not directly related to the present invention, the circuit operates as follows: When, for example, bits 1456 shown at the counter become 1, i.e. when 57 pulses have been counted, the transistors $Tr_{17}$ - $TR_{20}$ are turned on; a high level output is produced by a line $l_2$ through the diode 11 and a digital value of 010 is obtained as an output. The input-to-output relation is as follows: The output is 001 when 40 pulses have been counted; 010 when 64 pulses have beeen counted; 011 with 80 pulses counted; 100 with 114 pulses counted; and so on. In this manner, the output arithmetically varies while the input geometrically varies. The embodiment of the invention illustrated in FIGS. 2 and 3 operates in the following manner:

First, the on and off positions of the switches $SA_1$ - $SA_3$ are adjusted to a relative condition shown in FIG. 4a according to a desired diaphragm aperture value. The switches $SF_1$ - $SF_3$ are also adjusted in the same manner according to a desired value of film sensitivity. With the diaphragm aperture and film sensitivity values having been set in this manner, an unillustrated power source switch is turned on to bring each circuit into an operating state. The switch $SW_1$ is then turned on by this. The pulses from the pulse oscillator $PG_1$ are impressed upon the AND gate $AND_1$ through the switch $SW_1$, and the counter $ct_1$ begins to count the pulses. The content of the counter $ct_1$ is counted up by binary counting. The ladder circuit rD produces an analog voltage corresponding to the content of the counter. The analog voltage is impressed on one of the input terminals of the comparator $COM_1$. Since a high level output is produced by the comparator $COM_1$ when the voltage at the connection node a corresponding to a logarithm of the photographing object's brightness is higher than the output voltage of the ladder circuit, the output of the comparator comes to a low level when the content of the counter comes to coincide with the voltage at the node "a", and then a closed state of the AND gate $AND_1$ takes place. Because of this, a number of pulses corresponding to the logarithm of the brightness is counted up by binary counting at the counter $ct_1$. Thus, the content of the counter $ct_1$ is determined by the brightness. Furthermore, since the output of the comparator $COM_1$ at this time comes to a high level through the inverter $IN_1$, the AND gates $A_1 - A_4$ which have remained closed until then are brought into open states respectively. Therefore, the full subtractor $SUB_1$ then subtracts the content of the counter $c_1$, i.e. the logarithmic information on the brightness, from the diaphragm aperture value information set through the switches $SA_1 - SA_3$; the operation of $AV - Bv$ takes place; then another full subtractor $SUB_2$ subtracts the film sensitivity information set through the switches $SF_1$ through $SF_3$ from the output of the subtractor $SUB_1$; and the output of the subtractor $SUB_2$ which has become $Av - Bv - Sv = -Tv$ is transmitted to the register $rc_1$. As a result of this, the content of the register $rc_1$ becomes a digital value that corresponds to the shutter time. On the other hand, when the above stated comparator is inverted from a high level to a low level, another counter $ct_3$ begins the binary counting of the pulses produced by the pulse oscillator $PG_3$. In the initial stage, therefore, the content of the register $rc_1$ is greater than the content of the counter $ct_3$. Then, the input condition to the magnitude comparator becomes $A > B$ and there is produced an output of a low level at the output terminal Y. The output of the output terminal Y is inverted from the low level to a high level when the input condition becomes $A \leqq B$, i.e. when the content of the counter $ct_3$ becomes greater than the content of the register $rc_1$. This condition persists until every bit of the counter $ct_3$ is set as "1". Then, every bit of the counter $ct_3$ again is caused to becomes "0" by pulses subsequently arriving at the counter; and again the output of the magnitude comparator MCOM becomes a low level. By this, the output of the magnitude comparator MCOM obtained through the inverter $IN_2$ is inverted to a high level in a preset cycle $T_1$ as illustrated in FIG. 4b. The length of time required for the inversion from the high level to the low level, namely, the duty of pulse within the preset cycle $T_1$ is determined by the content of the register $rc_1$. The duty becomes to correspond to the shutter time information obtained through computation. Therefore, since the low-pass filter LPF integrates the output of the magnitude comparator MCOM, the output of the operational amplifier AP which constitutes the low-pass filter LPF becomes a value corresponding to the duty and the pointer of the meter M deflects according to the output of analogically display the shutter time information obtained through computation. In this manner, in accordance with this invention, the result of digital computation can be displayed through a very simple circuit arrangement. For controlling shutter time, an unillustrated shutter release lever is turned on to cause a front diaphragm of a shutter to travel and, concurrently with this, the switch $SW_2$ which is interlocked with the shutter release lever is turned on. Then, the counter $ct_2$ performs binary counting of the pulses from the pulse oscillator $PG_2$. The content of the counter $ct_2$ is converted into a logarithmically suppressed digital information. The coincidence detection circuit which comprises $ex_1 - ex_3$ and $NOR_1$ then detects the coincidence of the output of the register $rc_1$ with that of the code conversion circuit MC. When the two outputs coincide with each other, or in other words, when all of the inputs of the $NOR_1$ have become "0", to transistor $Tr_1$ is turned on to actuate the magnet Mg. This causes the rear diaphragm of the shutter to travel to complete the shutter control. In the above described example of embodiment, the output of the magnitude comparator is impressed upon the meter through the low-pass filter LPF. However, the same display operation can be accomplished by impressing the output of the comparator directly upon the meter as shown in FIG. 7, if the meter itself possesses an integrating characteristic.

Figure 8:
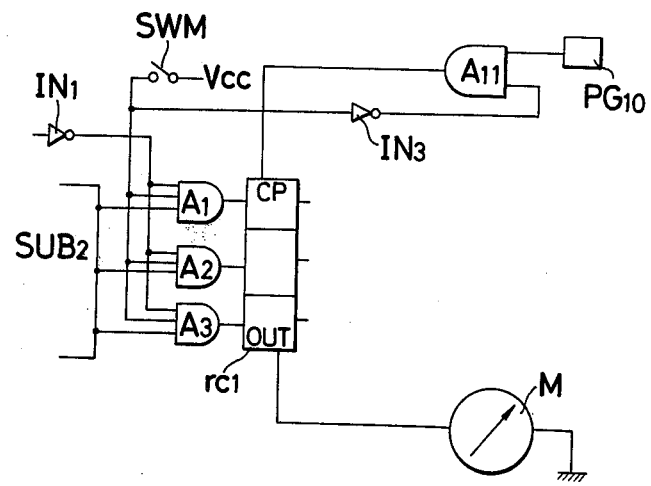
FIG. 8 is a circuit diagram illustrating a modification of the circuit illustrated in FIG. 5.

FIG. 5 is a circuit diagram illustrating another embodiment example of the display circuit of this invention. In FIG. 5 the computation circuits $SUB_1$, $SUB_2$ etc. and the shutter control circuit of the coincidence detection circuit, etc. are omitted from the illustration as they are identical with those used in the foregoing embodiment example. However, the display circuit shown in FIG. 5 differs from the one shown in FIG. 2. Unlike the arrangement shown in FIG. 2, the display circuit is formed in the following manner: An input signal coming from a switch SWM is impressed upon the AND gates $A_1 - A_3$; a pulse oscillator $PG_{10}$ is connected through an AND gate $A_{11}$ to a clock terminal cp of the register $rc_1$; and the output terminal of the register is connected to a conversion circuit which is arranged in accordance with the known method of Sharnnon-Rock and which comprises field effect transistors $FET_1$ and $FET_2$, a resistance $R_3$, capacitors $C_3$ and $C_4$ and an operational amplifier OP. The reference symbol $IN_3$ indicates an inverter; $bc_{10}$ a binary counter; and FF a flip-flop circuit. The embodiment illustrated in FIG. 5 operates in the following manner:

Prior to photographing, the switch SWM is turned on by an unillustrated operating means. By this, a power source switch is turned on. Then, in the same manner as in the case of FIG. 2, a digital value corresponding to the shutter time is stored in the register $rc_1$. Following this, the switch SWM is turned off by operating the above stated operating means. A high level signal is then impressed upon one of the input terminals of an AND gate $A_{11}$. By this, the pulses from a pulse oscillator $PG_{10}$ is supplied to the clock terminal cp of the register $rc_1$. The content of the register $rc_1$ is serially put out, being synchronized with the pulses, and is impressed upon the field effect transistor $FET_1$ in time series. This causes the transistor $FET_1$ to make on-off operation based on the digital value of the register $rc_1$. With the transistor $FET_1$ being in an "on" condition, the capacitor $C_3$ is charged with the electric current of a constant current source I and then the capacitor makes discharge through the resistance $R_3$ before the next pulse from the pulse oscillator enters the register $rc_1$. This process is repeated by the on-off operation of the transistor FET. Assuming that the content of the register is 1 1 0 as shown in FIG. 6, the second pulse from the pulse oscillator $PG_{10}$ turns on the field effect transistor $FET_1$. The capacitor $C_3$ is charged up to 8 V and then attenuates by half thus decreasing down to 4 V before the next pulse enters the register. Then, the register $rc_1$ puts out "1" which turns on the transistor $FET_1$; and the capacitor is charged 4 + 8 V and again attenuates by half and down to 6 V before another pulse enters the register. Following this, with the next pulse, the content of the register is put out. However, since the content is "0", the transistor $FET_1$ is not turned on. Therefore, the capacitor further attenuates by half and thus attenuating down to 3 V. In this manner, the value of 1 1 0 is converted into 3 V. Furthermore, at this time, that is, when the fourth pulse is put out from the oscillator $PG_{10}$, the output of the 3rd bit of the binary counter $bc_{10}$ is produced to turn on the field effect transistor $FET_4$; and the voltage of the capacitor $C_3$ is transmitted to the capacitor $C_4$ to cause the meter M to display the voltage. Then, the flip-flop circuit FF is set; the binary counter $bc_{10}$ is reset; and the transistor $FET_4$ is again turned off. In this manner, the content of the register $rc_i$ is converted into an analog value, which is displayed at the meter M. Where the shutter is to be controlled, the switch SWM is again turned on; the output of the full subtractor $SUB_2$ is again supplied to the register $rc_i$ to effect shutter release; and, by this, the shutter is controlled in exactly the same manner as in the case of FIG. 2. Furthermore, if a meter that possesses an integrating characteristic by itself is employed as the meter M as shown in FIG. 8, the display can be made in the same manner as in the embodiment example described in the foregoing, even if the meter is directly connected to the output terminal of the register $rc_1$.

As disclosed in detail in the foregoing, in accordance with the present invention, the digitally computed value of information relative to exposure is displayed by a meter through a very simple display circuit arrangement. With the display circuit simplified, the power comsumption required for display can be reduced to a great extent. The invented display circuit, therefore, has a great advantage when applied to a camera wherein digital computation is performed for display.

What is claimed is:

1. A display circuit for a camera comprising:
   (a) an exposure information producing circuit for producing a digital value corresponding to exposure information;
   (b) a storing means for storing the digital value produced by said exposure information producing circuit;
   (c) a pulse signal producing circuit coupled to said storing means for producing a pulse signal with a duty cycle corresponding to the digital value produced by said exposure information producing circuit; and
   (d) a meter coupled to said pulse signal producing circuit for displaying the exposure information.

2. A display circuit according to claim 1 in which said pulse signal producing circuit comprises:
   a pulse generating means for producing a pulse in a preset cycle; a counter means for counting the pulses from said pulse generating means in a predetermined cycle; a comparison circuit for comparing the digital value from said exposure information producing circuit with a value counted by said counter means which inverts its output signal when said digital value and said counted value reach a preset relation to each other, so that said comparison circuit produces a pulse with a duty cycle corresponding to the digital value stored in the storing means.

3. A display circuit for a camera comprising:
   (a) an exposure information producing circuit for producing a digital value corresponding to exposure information;
   (b) a storing means for storing the digital value produced by said exposure information producing circuit;
   (c) a pulse signal producing circuit coupled to said storing means for producing a pulse signal with a duty cycle corresponding to the digital value produced by said exposure information producing circuit;
   (d) an integrating circuit coupled to said pulse signal producing circuit for integrating the pulse signal from said pulse signal producing circuit; and
   (e) a meter connected to said integrating circuit for displaying the exposure information.

4. A display circuit according to claim 3 in which said pulse signal producing circuit comprises:
   a pulse generating means for producing a pulse in a present cycle; a counter means for counting the pulses from said pulse generating means in a predetermined cycle; a comparison circuit for comparing the digital value from said exposure information producing circuit with a value counted by said counter means which inverts its output signal when said digital value and said counted value reach a preset relation to each other, so that said comparison circuit produces a pulse with a duty cycle corresponding to the digital value stored in the storing means.

5. A display circuit for a camera comprising:
   (a) an exposure information producing circuit for producing a digital value corresponding to exposure information;
   (b) a storing means for storing the digital value produced by said exposure information producing circuit;
   (c) a pulse signal producing circuit coupled to said storing means for producing pulses in time series according to the digital values stored in the storing means, and
   (d) a meter coupled to said pulse producing circuit for displaying the exposure information.

6. A display circuit according to claim 5 in which said camera comprises an integrating circuit connected between said pulse signal producing circuit and said meter.

7. A display circuit for a camera comprising:
   (a) an exposure information producing circuit for producing a digital value corresponding to exposure information;
   (b) a storing means for storing the digital value produced by said exposure information producing circuit;
   (c) a pulse signal producing circuit for serially supplying pulses corresponding to said digital value stored in the storing means; and
   (d) a meter coupled to said pulse signal producing circuit for displaying exposure value.

8. A display circuit according to claim 7 in which said camera comprises an integrating circuit connected between said pulse signal producing circuit and said meter.

* * * * *

UNITED STATES PATENT OFFICE
CERTIFICATE OF CORRECTION

Patent No. 4,089,010                  Dated May 9, 1978

Inventor(s) TADASHI ITO, NOBUAKI SAKURADA, et al

It is certified that error appears in the above-identified patent and that said Letters Patent are hereby corrected as shown below:

In the heading of the patent [75] should read as follows:

[75] Inventers: Tadashi Ito; Nobuaki Sakurada, both of Yokohama; Masaharu Kawamura, Tokyo; Nobuhiko Shinoda, Tokyo; Fumio Ito, Yokohama; Hiroyashu Murakami, Tokyo, all of Japan Signed and Sealed this Third Day of October 1978

[SEAL]

Attest:

RUTH C. MASON
*Attesting Officer*

DONALD W. BANNER
*Commissioner of Patents and Trademarks*